US012668369B2

(12) United States Patent
Meriel et al.

(10) Patent No.: US 12,668,369 B2
(45) Date of Patent: Jun. 30, 2026

(54) REMOVABLE CLOSURE MEMBER FOR A FEMALE PORTION RECEIVED IN AN EXTERNAL OPENING OF AN AIRCRAFT ENGINE NACELLE

(71) Applicant: SAFRAN NACELLES, Gonfreville-l'Orcher (FR)

(72) Inventors: Olivier Meriel, Moissy-Cramayel (FR); Vivien Lucienne, Moissy-Cramayel (FR)

(73) Assignee: SAFRAN NACELLES, Gonfreville-l'Orcher (FR)

( * ) Notice: Subject to any disclaimer, the term of this patent is extended or adjusted under 35 U.S.C. 154(b) by 579 days.

(21) Appl. No.: 17/995,508

(22) PCT Filed: Apr. 8, 2021

(86) PCT No.: PCT/FR2021/050626
§ 371 (c)(1),
(2) Date: Oct. 5, 2022

(87) PCT Pub. No.: WO2021/205126
PCT Pub. Date: Oct. 14, 2021

(65) Prior Publication Data
US 2023/0174245 A1      Jun. 8, 2023

(30) Foreign Application Priority Data

Apr. 10, 2020    (FR) ...................................... 2003633

(51) Int. Cl.
*B64D 33/08*      (2006.01)
*B64D 29/08*      (2006.01)
*F01D 25/24*      (2006.01)
(52) U.S. Cl.
CPC ............. *B64D 29/08* (2013.01); *B64D 33/08* (2013.01); *F01D 25/24* (2013.01)

(58) Field of Classification Search
CPC .. B64C 7/00; B64C 7/02; B64D 33/02; B64D 33/022; B64D 33/0246; B64D 33/04;
(Continued)

(56) References Cited

U.S. PATENT DOCUMENTS

| | | | | | |
|---|---|---|---|---|---|
| 2,779,433 | A | * | 1/1957 | Winslow ................ | B64D 33/02 55/306 |
| 2006/0249627 | A1 | * | 11/2006 | Martin Hernandez ... | B64C 7/00 244/130 |

(Continued)

FOREIGN PATENT DOCUMENTS

| | | | |
|---|---|---|---|
| EP | 3 260 939 A1 | 12/2017 |
| EP | 3 447 272 A1 | 2/2019 |

(Continued)

OTHER PUBLICATIONS

International Search Report mailed May 27, 2021, issued in corresponding International Application No. PCT/FR2021/050626, filed Apr. 8, 2021, 5 pages.

(Continued)

*Primary Examiner* — Joshua J Michener
*Assistant Examiner* — Colin Zohoori
(74) *Attorney, Agent, or Firm* — CHRISTENSEN O'CONNOR JOHNSON KINDNESS PLLC

(57) ABSTRACT

A removable closure member is configured to close a female portion received in an external opening formed in the external surface of a nacelle for an aircraft engine. The female portion includes at least one air inlet opening. The closure member includes a base that forms the external contour of the member and that extends beyond the external opening of the nacelle so as to move into abutment against the external surface of the nacelle. The closure member further includes at least one resiliently deformable position
(Continued)

retention member that projects from the base and is configured to be inserted into the air inlet opening.

15 Claims, 5 Drawing Sheets

(58) Field of Classification Search
CPC ..... B64D 33/08; B64D 2241/00; F01D 25/14;
F01D 25/24; F05D 2260/20; F05D
2260/607; F05D 2260/608; F04D 29/582;
F04D 29/584; F04D 29/701
See application file for complete search history.

(56) References Cited

U.S. PATENT DOCUMENTS

| | | | | |
|---|---|---|---|---|
| 2011/0240137 A1* | 10/2011 | Vauchel | ................. | B64D 29/00 137/15.2 |
| 2011/0253843 A1* | 10/2011 | Porte | ..................... | B64D 33/08 244/53 B |
| 2015/0075132 A1 | 3/2015 | Kohn et al. | | |
| 2015/0089879 A1* | 4/2015 | Sparks | ................... | B64F 1/005 49/460 |
| 2020/0130811 A1* | 4/2020 | Crawford | ................. | B64C 7/02 |

FOREIGN PATENT DOCUMENTS

| | | |
|---|---|---|
| FR | 2 879 564 A1 | 6/2006 |
| FR | 2 936 778 A1 | 4/2010 |

OTHER PUBLICATIONS

Written Opinion mailed May 27, 2021, issued in corresponding International Application No. PCT/FR2021/050626, filed Apr. 8, 2021, 7 pages.
English translation of Written Opinion mailed May 27, 2021, issued in corresponding International Application No. PCT/FR2021/050626, filed Apr. 8, 2021, 6 pages.
International Preliminary Report on Patentability mailed Oct. 6, 2022, issued in corresponding International Application No. PCT/FR2021/050626, filed Apr. 8, 2021, 8 pages.

* cited by examiner

REMOVABLE CLOSURE MEMBER FOR A FEMALE PORTION RECEIVED IN AN EXTERNAL OPENING OF AN AIRCRAFT ENGINE NACELLE

FIELD OF THE DISCLOSURE

The present disclosure relates to the field of aircraft, and in particular of the fairings of an aircraft engine, called "nacelle".

More particularly, the disclosure relates to closure members configured to close external openings of aircraft engines, and in particular made in their nacelle.

BACKGROUND

An aircraft nacelle allows the linking of the engine to the fuselage of the aircraft, but also to control the internal temperature of the engine via one or more air inlet openings intended to cool the engine.

The nacelle comprises, for this purpose, one or more external openings, such as air inlet members or scoops, called "ventilation scoop", configured to bring cool air into certain zones of the engine, in particular zones at high temperatures, and one or more ventilation members or ventilation grids allowing to evacuate towards the exterior of the nacelle hot air from the engine in order to fight against the formation of hot spots on elements of the engine, or to evacuate possible overpressures of the engine.

During the extended parking of the aircraft, it is known to close the external openings of the nacelle of the engine, in order to protect them against the intrusion of foreign bodies, such as dust, fauna or flora.

The members for closing the external openings of the nacelle are put in place by using ground support equipment, having the acronym GSE. Thus, the interface between the closure members and the nacelle imposes design constraints of the ground support equipment.

Indeed, the complex shape of the nacelle imposes a very high control in the design and the shape of the closure member, which requires very low manufacturing tolerances of the member.

Members for closing air inlet or evacuation openings in the form of a complex assembly of rigid mechanical parts comprising a metal plate drawn to conform to the shape of the opening to be closed are known. The closure plate is fastened onto the nacelle using metal fastening lugs that project towards the exterior of the nacelle. Such a closure plate has the disadvantage of being particularly heavy and sensitive to falls and impacts, so that it represents a danger for the people moving around the aircraft, and also for the other vehicles or equipment present on the ground.

Moreover, the fastening lugs represent a danger for the people moving around the aircraft, since they are made of rigid metal material and project with respect to the closure plate. They also risk damaging the nacelle during their fastening onto the nacelle. The rigidity of such a closure member imposes very low manufacturing tolerances in order to guarantee the functionality of the closure member.

SUMMARY

The goal of the present disclosure is therefore to overcome the disadvantages of the aforementioned closure members and to propose a member for closing the external openings of a nacelle for an aircraft engine configured to adapt to the geometric variations of the openings, while ensuring better protection of the nacelle during the fastening of the closure member onto the nacelle, and of the people and/or physical elements present on the ground during the fall of the closure member.

The goal of the disclosure is therefore to allow an easy and low-cost closure of an external opening of a nacelle for an aircraft engine.

The object of the disclosure is therefore a removable closure member configured to close a female portion, for example such as an air inlet or ventilation member, received in an external opening made in the external surface of a nacelle for an aircraft engine. The female portion comprises at least one opening into the nacelle.

The closure member comprises a base forming the external contour of the member and intended to extend beyond the external opening of the nacelle so as to move into abutment against the external surface of the nacelle and at least one resiliently deformable position retention member configured to be inserted into the opening of the female portion.

The resiliently deformable position retention member allows to ensure the retention in position of the closure member in the associated female portion.

Thus, the closure member is configured to adapt to the geometric variations of the openings, while ensuring better protection of the nacelle during the fastening of the member onto the nacelle since the fastening is carried out by deformation of the deformable portions of the member.

The retention member can project from the base.

Nacelle means the case or fairing surrounding the aircraft engine and forming with the engine a propulsion assembly. The engine can in particular be a turbojet engine or a turboprop engine.

Resiliently deformable means any member configured to deform in a reversible manner under the action of an external stress and returning to its initial shape upon stoppage of the stress.

Advantageously, the closure member comprises a gripping means extending from the base that projects towards the exterior, on the side opposite to the position retention member. For example, the gripping means can be a handle, a ring, a loop, a cord or any other manipulation member configured to manipulate the closure member. For example, the closure member comprises a core made of foam surrounded by a layer of elastomer, for example by projection.

Thus, the risk of damage to the people and/or the physical elements present on the ground during the fall of the closure member is reduced via the low mass of the member. Moreover, the closure member is easy to produce and at a low cost.

According to one embodiment, the closure member comprises two inclined portions, each intended to cooperate with a fin of the female portion, the retention member of the closure member being configured to cooperate with at least one of the openings of the female portion.

Advantageously, the base of the closure member comprises at least one first portion extending according to a direction substantially normal to the inclined portions and connected to the inclined portions.

In a manner that is in no way limiting, the first portion forms an axis of symmetry of the closure member.

Advantageously, the closure member comprises two lateral portions extending on either side of the first portion and configured to cooperate with portions of fins of the female portion, each of the lateral portions comprising a plurality of inclined portions.

For example, each of the lateral portions comprises two inclined portions of ends and at least one central inclined portion, the retention member comprising two end studs configured to each cooperate with an end opening of the female portion and at least one central stud configured to cooperate with a central opening of the female portion.

At least the studs of ends can each comprise a lip that projects from the free end of the stud and extends towards an end inclined fin of the female portion.

According to another embodiment, the position retention member comprises a stud that projects from the base towards the female portion and includes a lip that projects from the free end of the stud and is configured to be inserted into the opening of the female portion.

According to a second aspect, the disclosure relates to a nacelle for an aircraft engine comprising an external surface of revolution including at least one external opening intended to receive a female portion and comprising at least one closure member as defined above configured to temporarily close the female portion, for example during an extended stoppage on the ground of the aircraft. The closure member is intended to be removed before the phase of flight of the aircraft.

The external opening is made in the thickness of the nacelle and opens onto the external surface of the nacelle.

According to one embodiment, the female portion is a ventilation member or ventilation grid, comprising a fastening portion fastened onto the nacelle, for example against an internal surface of the nacelle by fastening elements, such as, for example, rivets, at least two ventilation fins connected to the fastening portion and evacuation openings made between two adjacent fins. The ventilation grid is configured to be closed by a first closure member comprising two inclined portions each intended to cooperate with a fin of the ventilation grid. The retention member of the first closure member is configured to cooperate with at least one of the evacuation openings of the grid.

Advantageously, the ventilation grid comprises a portion, for example central, forming an axis of symmetry of the ventilation grid, and two portions of fins located on either side of the central portion and each comprising a plurality of ventilation fins connected to the central portion. The base of the first closure member comprises a first portion and two lateral portions extending on either side of the first portion and configured to cooperate with the portions of fins of the ventilation grid, each of the lateral portions comprising a plurality of inclined portions each intended to cooperate with a fin of the ventilation grid.

For example, each portion of fins comprises two end fins, at least one central fin, two end evacuation openings made respectively between the fastening portion and a first end fin and between a second end fin, an adjacent central fin, and at least one central evacuation opening made between the first end fin and the central fin. Each of the lateral portions of the first closure member comprises two inclined portions of ends and at least one central inclined portion, the retention member of the first closure member on the ventilation grid comprising two end studs configured to each cooperate with an end evacuation opening and at least one central stud configured to cooperate with the central evacuation opening.

Alternatively, there could be a different number of central fins. The fins form walls inclined according to the same direction and the same angle of inclination.

Alternatively, there could be walls inclined according to different angles of inclination.

The ventilation openings open inside the nacelle in order to transport air towards the engine.

The ventilation grid is made of a rigid material.

Alternatively, there could be a different number of central inclined portions. The inclined portions are inclined according to the same direction and the same angle of inclination.

Alternatively, there could be portions inclined according to different angles of inclination.

The end studs respectively connect the base to a first inclined end portion and the second inclined end portion to an adjacent inclined central portion.

Advantageously, at least the studs of ends each comprise a lip or projection that projects from the free end of the stud and extends towards an end inclined fin of the ventilation grid.

The lips of the closure member are configured to resiliently deform during the installation of the closure member on the ventilation grid and are inserted under the associated fin and thus to retain the closure member in place.

According to another embodiment, the female portion is an air inlet member or a scoop, called ventilation scoop, comprising a fastening portion fastened onto the nacelle, for example against an internal surface of the nacelle by fastening elements, such as, for example, rivets, a bottom connected on one side to the fastening portion and a rigid wall connected to a second side of the fastening portion and defining with the bottom an air inlet opening. The scoop is configured to be closed by a second closure member. The base of the second closure member further comprises a stud that projects from the base towards the scoop and includes a lip or projection that projects from the free end of the stud and is configured to be inserted into the air inlet opening of the scoop.

The stud is configured to resiliently deform during the installation of the second closure member on the scoop and its lip is inserted under the rigid wall into the air inlet opening and thus retains the closure member in place.

The second closure member is installed by inserting the stud into the opening of the scoop, resiliently deforming its lip.

The air inlet opening opens inside the nacelle in order to transport air towards the engine.

The fastening portion forms a contour of the scoop.

The rigid wall extends beyond the opening of the nacelle.

The scoop is made of a rigid material.

For example, the nacelle comprises at least one first opening, a ventilation member received in the first opening and configured to be closed by a first closure member, at least one second opening and an air inlet member received in the second opening configured to be closed by a second closure member.

The first and the second closure member are structurally different.

DESCRIPTION OF THE DRAWINGS

Other goals, features and advantages of the disclosure will appear upon reading the following description, given only as a non-limiting example, and made in reference to the indexed drawings in which:

FIG. 1 very schematically illustrates a perspective view of a nacelle for an aircraft engine comprising closure members according to two embodiments of the disclosure;

DETAILED DESCRIPTION

Figure 1:
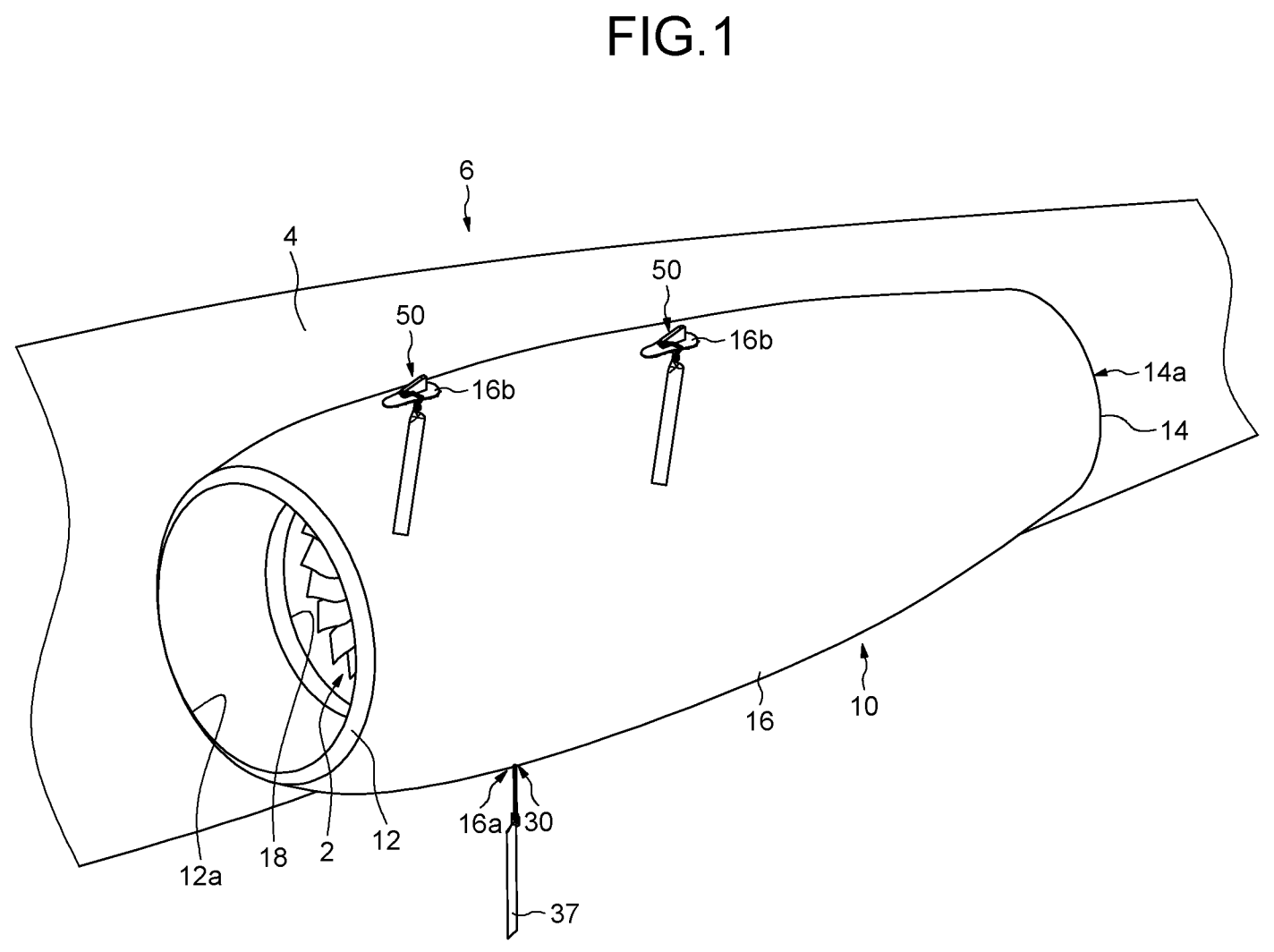
Figure 2:
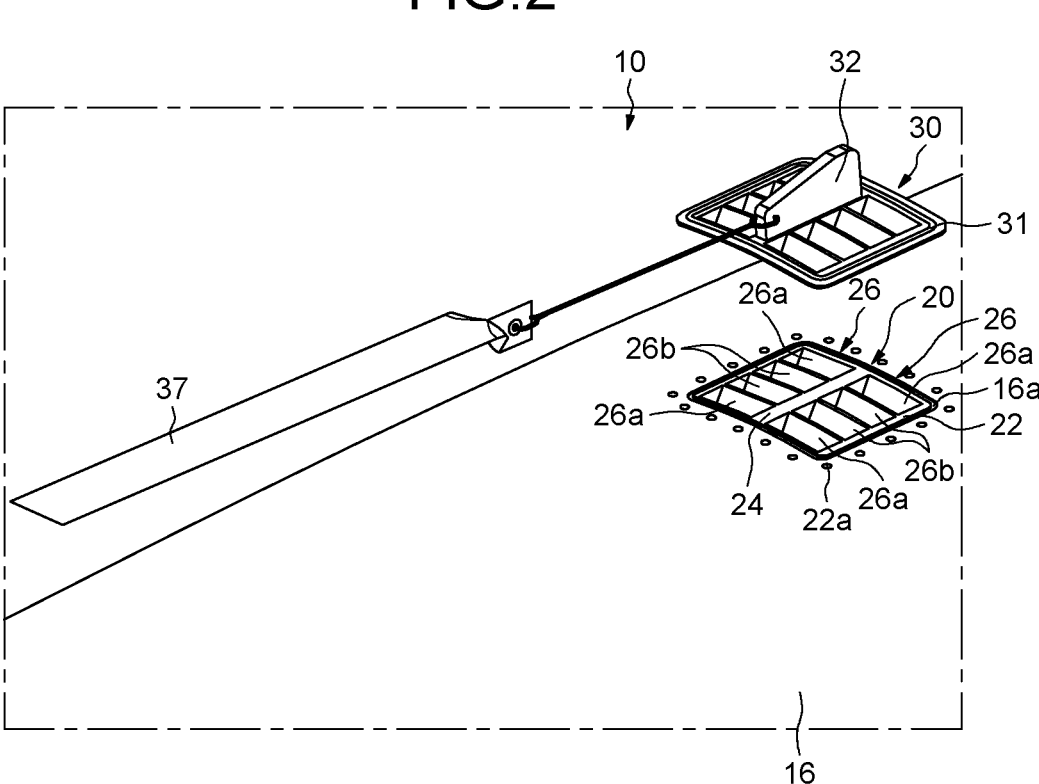
FIGS. 2 and 3 show a closure member according to a first embodiment, respectively before and after installation in an external opening of the nacelle of FIG. 1.
Figure 3:
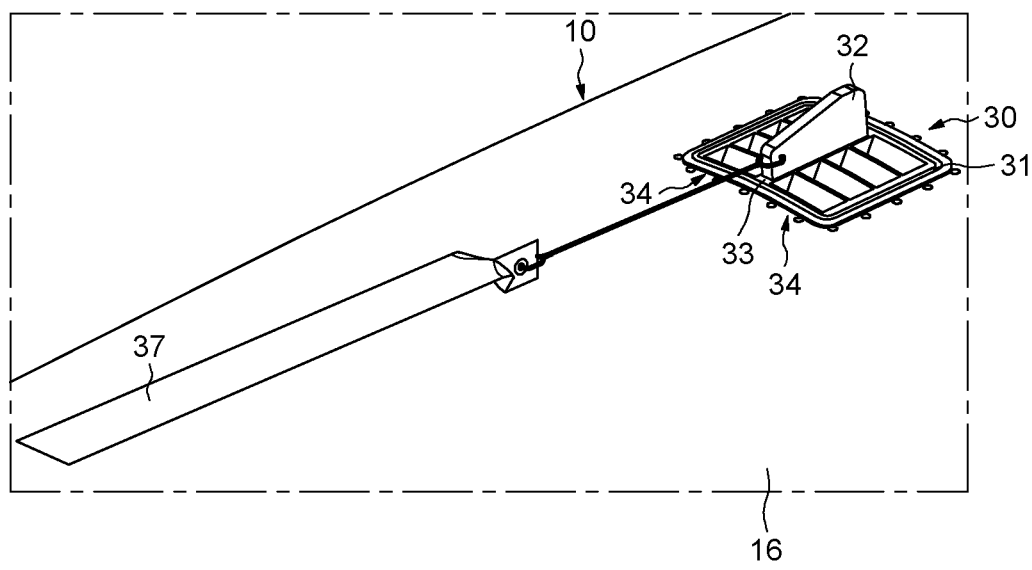

FIG. 1 very schematically shows a nacelle 10 for an aircraft engine 2 intended to be connected to the fuselage 4 of an aircraft 6. For reasons of clarity, only the fan of the engine 2 is visible in FIG. 1.

The nacelle 10 is defined axially by a leading edge 12 and a trailing edge 14, opposite to the leading edge 12, and radially by an external surface 16 and an internal surface 18. In a non-limiting manner, the external surface 16 illustrated is a surface of revolution.

The leading and trailing edges 12, 14 comprise an opening 12a, 14a, respectively, for the inlet of air and the outlet of the exhaust gases of the engine 2.

As illustrated in FIG. 1, the nacelle 10 comprises a first opening 16a made in the thickness of the nacelle 10 and opening onto the external surface 16 of the nacelle 10. As illustrated, the first opening 16a is located on a lower portion of the external surface 16 of the nacelle 10. Alternatively, it is possible for the nacelle to comprise a number of first openings greater than one, for example greater than or equal to two. It is also possible for the first opening to be located at a location of the nacelle other than its lower portion.

The first opening 16a is intended to receive a ventilation member or ventilation grid 20.

Figures 4, 5A, 5B:
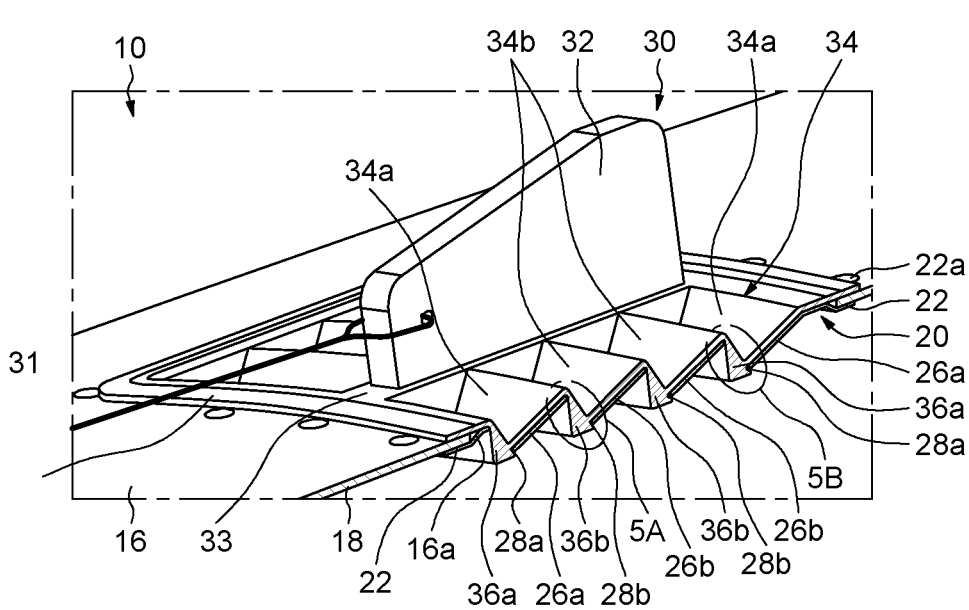
FIG. 4 is a cross-sectional view of the closure member of FIG. 3.
FIGS. 5A and 5B are views of details of the closure member of FIG. 4.
Figure 6:
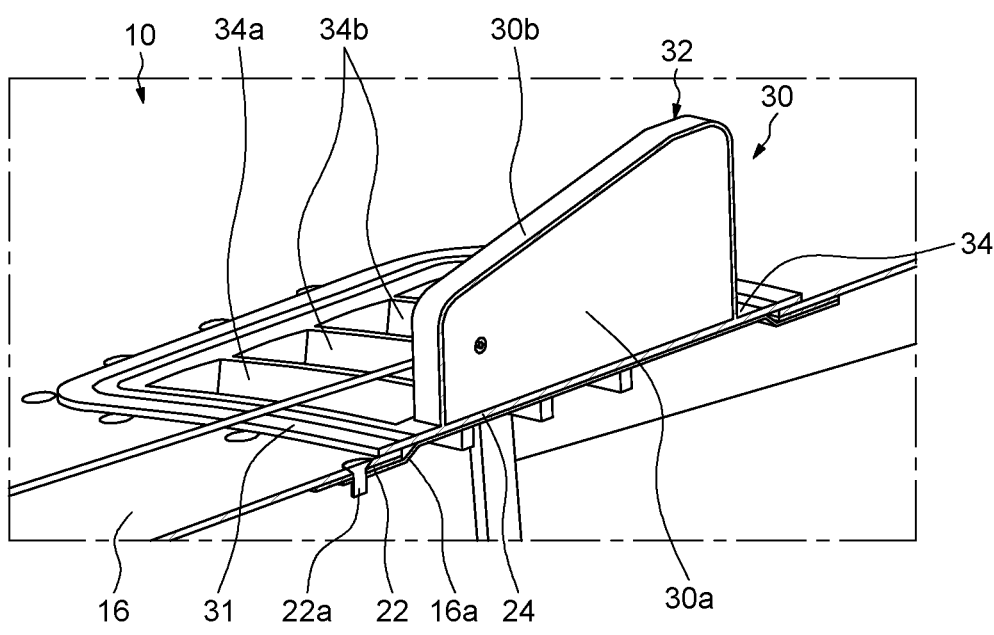
FIG. 6 is a cross-sectional view of the closure member of FIG. 3 according to a cutting plane passing through a central portion.

The ventilation grid 20 is visible in details in FIGS. 4 and 6.

The ventilation grid 20 is made of a rigid material.

The ventilation grid 20 comprises a fastening portion 22 fastened onto the nacelle 10, for example here against the internal surface 18 of the nacelle by fastening elements 22a, such as, for example, rivets. Alternatively, the fastening portion 22 could be integrated into the nacelle 10.

The fastening portion 22 forms a contour of the ventilation grid 20.

The ventilation grid 20 further comprises a central portion 24, forming an axis of symmetry of the ventilation grid 22 and two portions of fins 26 located on either side of the central portion 24 and each comprising a plurality of ventilation fins 26a, 26b connected to the central portion 24.

As illustrated in FIG. 4, each portion of fins 26 comprises two end fins 26a and two central fins 26b. Alternatively, there could be a different number of central fins 26b. The fins 26a, 26b form walls inclined according to the same direction and the same angle of inclination.

Alternatively, there could be walls 26a, 26b inclined according to different angles of inclination.

The ventilation grid 20 further comprises evacuation openings 28a, 28b made between two adjacent fins.

More specifically, the grid 20 comprises two end evacuation openings 28a made respectively between the fastening portion 22 and a first end fin 26a and between a second end fin 26a and an adjacent central fin.

The evacuation openings 28a, 28b open inside the nacelle 10 in order to evacuate air from the engine 2 towards the exterior.

A removable first closure member 30 is configured to temporarily close the first external opening 16a, for example during a prolonged stoppage of the aircraft on the ground.

The first closure member 30 is illustrated in details in FIGS. 2 to 6.

The first closure member 30 comprises a base 31 forming the external contour of the member and a handle 32 extending as a projection from the base 31. The base 31 extends beyond the external opening 16a of the nacelle 10 so as to move into abutment against the external surface 16 of the nacelle.

The base 31 comprises a first portion 33 and two lateral portions 34 extending on either side of the first portion 33. As illustrated, the first portion 33 extends according to a direction substantially normal to the lateral portions 34 and is connected to the lateral portions 34.

In a manner that is in no way limiting, the first portion 33 is central and forms an axis of symmetry of the closure member 30.

The lateral portions 34 are configured to cooperate with the portions of fins 26 of the ventilation grid 20.

Each of the lateral portions 34 comprises a plurality of inclined portions 34a, 34b each intended to cooperate with a fin 26a, 26b of the ventilation grid 20.

As illustrated, each lateral portion 34 comprises two inclined portions of ends 34a and two central inclined portions 34b. Alternatively, there could be a different number of central inclined portions 34b. The inclined portions 34a, 34b are inclined according to the same direction and the same angle of inclination.

Alternatively, there could be portions 34a, 34b inclined according to different angles of inclination.

Each of the lateral portions 34 further comprises studs 36a, 36b that project from the base 31 towards the ventilation grid 20 and are configured to be inserted into a corresponding evacuation opening 28a, 28b of the ventilation grid 20.

More specifically, each of the lateral portions 34 comprises two end studs 36a and two central studs 36b, the number of central studs being dependent on the number of central fins 26b.

The end studs 36a respectively connect the base 31 to a first inclined end portion 34a and the second inclined end portion 34a to an adjacent inclined central portion 36b.

The studs of ends 36a each comprise a lip 36c or projection that projects from the free end of the stud and extends towards an end inclined fin 26a of the ventilation grid 20.

The lips 36c are configured to resiliently deform during the installation of the closure member 30 on the ventilation grid 20 and be inserted under the associated fin 26a and thus retain the closure member in place.

In this case, the lip 36c of the stud is deformed by contact with a rigid inclined wall of the ventilation grid and snaps onto the rigid inclined wall, in the corresponding evacuation opening.

The end studs 36a, the lips 36c of which grab hold in a rigid wall 26a of the ventilation grid 20, allow to ensure the immobilization of the first closure member 30.

Alternatively, it is possible for each of the studs 36a, 36b to comprise a resiliently deformable lip configured to cooperate with a fin of the ventilation grid 20.

The first closure member 30 is installed only by a pressure stress of the latter on the ventilation grid 20, resiliently deforming the lip 36c of the corresponding stud 36a.

The first closure member 30 is symmetrical with respect to its first portion 33.

As illustrated in details in FIG. 6, the first closure member 30 is a one-piece part made of a composite material from a core 30*a* made of foam coated with a projected elastomer layer 30*b*. The core 30*a* made of foam is, for example, made by injection or extrusion, machined, printed in three dimensions or made by any other means for making a foam.

As illustrated in FIG. 6, the handle 32 comprises the core 30*a* made of foam surrounded by the layer 30*b* of projected elastomer forming the base 31. The base 31 is made in the same phase of projection of elastomer onto a template made via additive manufacturing.

The layer 30*b* of elastomer can be, for example, polyurethane.

In a manner that is in no way limiting, the first closure member 30 comprises an extraction tab 37 fastened to the handle and allowing the unclipping of the closure member from the ventilation grid during an external traction stress on the tab.

As illustrated in FIG. 1, the nacelle 10 comprises two second openings 16*b* made in the thickness of the nacelle 10, in particular but not exclusively on its upper portion, and opening onto the external surface 16 of the nacelle 10. Alternatively, it is possible for the nacelle to comprise a number of second openings different than two, for example equal to one, or for example greater than or equal to three. It is also possible for the second openings to be located at a location of the nacelle other than its upper portion.

Each second opening 16*b* is intended to receive an air inlet opening or scoop 40 called ventilation scoop.

Figure 7:
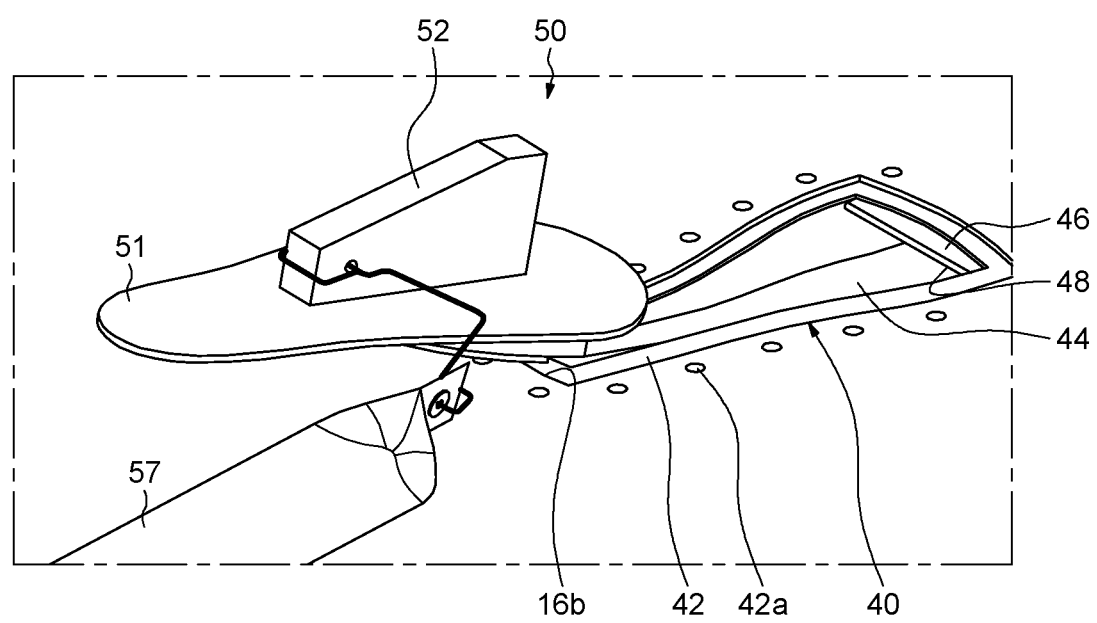
FIGS. 7 and 8 show a closure member according to a second embodiment, respectively before and after installation in an external opening of the nacelle of FIG. 1.
Figure 9:
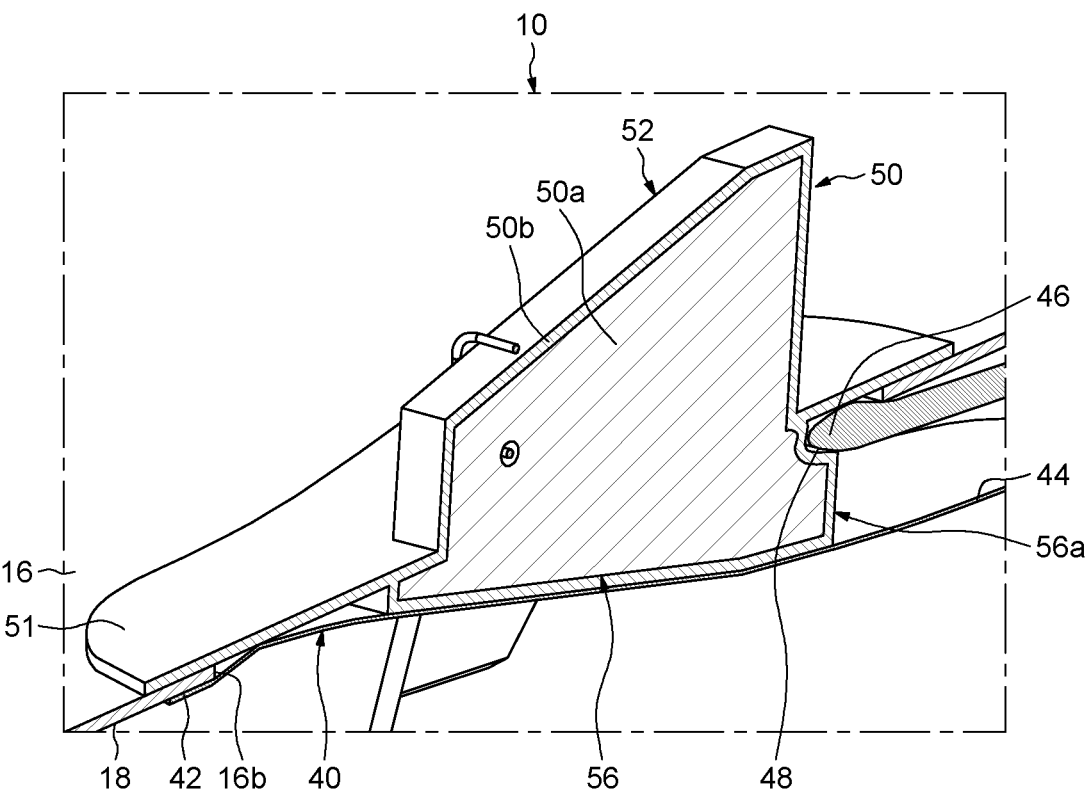
FIG. 9 is a cross-sectional view of the closure member of FIG. 8.

The scoop 40 is visible in details in FIGS. 7 and 9. The scoop 40 is made of a rigid material.

The scoop 40 comprises a fastening portion 42 fastened against the internal surface 18 of the nacelle 10 by fastening elements 42*a*, such as, for example, rivets.

The fastening portion 42 forms a contour of the scoop 40.

The scoop 40 further comprises a bottom 44 connected on one side to the fastening portion 42 and a rigid wall 46 connected to a second side of the fastening portion 42 and defining with the bottom 44 an air inlet opening 48 opening inside the nacelle 10 in order to transport cool air towards the engine 2.

The rigid wall 46 extends beyond the opening 16*b* of the nacelle 10.

Each removable second closure member 50 is configured to temporarily close one of the second external openings 16*b*, for example during a prolonged stoppage of the aircraft on the ground.

Figure 8:
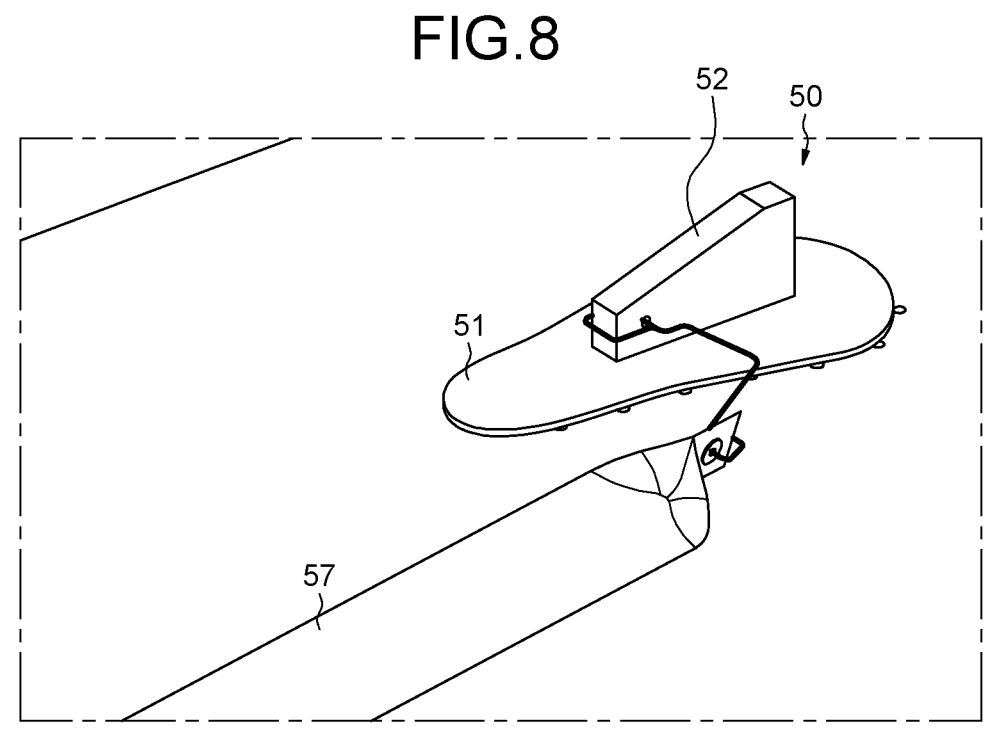

The second closure member 50 is illustrated in details in FIGS. 7 to 9.

The second closure member 50 comprises a base 51 forming the external contour of the member and a gripping means, such as a handle 52 extending as a projection from the base 51. The base 51 extends beyond the external opening 16*b* of the nacelle 10 so as to move into abutment against the external surface 16 of the nacelle.

The base 51 further comprises a stud 56 that projects from the base 51 towards the scoop 40.

The stud 56 comprises a lip 56*a* or projection that projects from the free end of the stud and is configured to be inserted into the air inlet opening 48 of the scoop 40.

The stud 56 is configured to resiliently deform during the installation of the second closure member 50 on the scoop 40 and its lip 56*a* is inserted under the rigid wall 46 into the air inlet opening 48 and thus retains in place the closure member 50.

In other words, the lip 56*a* of the stud 56 is deformed by contact with a rigid wall of the scoop 40 and snaps onto the rigid wall, in the corresponding air inlet opening.

The resiliently deformable lip grabs hold in a rigid wall 46 of the scoop 40 allowing to ensure the immobilization of the second closure member 50.

The second closure member 50 is installed by inserting the stud into the opening of the scoop 40, resiliently deforming its lip 56*a*.

The second closure member 50 is symmetrical with respect to its handle 52.

As illustrated in details in FIG. 9, the second closure member 50 is a one-piece part made of a composite material from a core 50*a* made of foam coated with a projected elastomer layer 50*b*. The core 50*a* made of foam is, for example, made by injection or extrusion, machined, printed in three dimensions or made by any other means for making a foam.

As illustrated in FIG. 9, the handle 52 comprises the core 50*a* made of foam surrounded by the layer 50*b* of projected elastomer forming the base 51. The base 51 is made in the same phase of projection of elastomer onto a template made via additive manufacturing.

The layer 50*b* of elastomer can be, for example, polyurethane.

In a manner that is in no way limiting, the second closure member 50 comprises an extraction tab 57 fastened to the handle and allowing the unclipping of the closure member from the scoop during an external traction stress on the tab.

In general, the ventilation grid 20 and the scoop 40 form female portions respectively received in an external opening 16*a*, 16*b* made on the external surface 16 of revolution of the nacelle 10. The closure members of the female portions 30, 50 must be removed before the phase of flight of the aircraft, in order to leave all of the external openings open.

In general, the stud(s) of the closure members are resiliently deformable position retention members configured to ensure the retaining in position of the closure member in the associated female portion.

Via the closure members described, the risk of injury is significantly reduced via the reduction of the weight and via the absence of a projecting rigid part on the member.

The nacelle is no longer damaged during the installation of the closure member in the associated female portion.

The closure member is a one-piece part, which considerably reduces the number of parts and the manufacturing time of the member, engendering a significant reduction in the manufacturing and maintenance cost.

The use of a flexible composite material for the closure member allows to adapt to the dimensional variations of the interfaces.

The invention claimed is:

1. A removable closure member configured to close a female portion received in an external opening made in an external surface of a nacelle for an aircraft engine, said female portion comprising at least one opening that opens into the nacelle, said closure member comprising:

a base forming an external contour of said member and configured to extend beyond the external opening of the nacelle so as to move into abutment against the external surface of said nacelle; and at least one resiliently deformable position retention member that projects from the base and is configured to be inserted into the opening of the female portion, wherein said position retention member comprises a stud comprising a lip that projects from the free end of the stud and extends toward a rigid portion of the female portion, said lip being deformable by contact with said rigid portion and configured to snap behind said rigid portion in the corresponding opening of the female portion so as to retain the closure member in position, wherein said stud is configured to cooperate with a ventilation grid or a scoop that is mounted in the female portion and that defines said opening.

2. The closure member according to claim 1, further comprising a gripping means extending from the base that projects towards the exterior, on the side opposite to the position retention member.

3. The closure member according to claim 1, further comprising a core made of foam surrounded by a layer of elastomer.

4. The closure member according to claim 1, further comprising two inclined portions each configured to cooperate with a fin of the female portion, the retention member of said closure member being configured to cooperate with at least one of the openings of said female portion.

5. The closure member according to claim 4, wherein the base of said closure member comprises a first portion extending according to a direction normal to the inclined portions and connected to said inclined portions.

6. The closure member according to claim 5, wherein the first portion forms an axis of symmetry of the closure member.

7. The closure member according to claim 5, further comprising two lateral portions extending on either side of the first portion and configured to cooperate with portions of fins of the female portion, each of the lateral portions comprising a plurality of the inclined portions.

8. The closure member according to claim 7, wherein each of the lateral portions comprises two inclined portions of ends and at least one central inclined portion, the retention member comprising two end studs configured to each cooperate with an end opening of the female portion and at least one central stud configured to cooperate with a central opening of said female portion.

9. The closure member according to claim 8, wherein at least the studs of ends each comprise a lip that projects from a free end of said stud and is configured to extend towards an end inclined fin of the female portion.

10. The closure member according to claim 1, wherein the position retention member comprises a stud that projects from the base and is configured to extend towards the female portion and includes a lip that projects from a free end of said stud and is configured to be inserted into the opening of said female portion.

11. A nacelle for an aircraft engine, the nacelle comprising:

an external surface including at least one external opening configured to receive a female portion; and at least one closure member according to claim 4, the at least one closure member being configured to temporarily close said female portion.

12. The nacelle according to claim 11, wherein the female portion is an air ventilation member comprising a fastening portion configured to be fastened onto the nacelle, at least two ventilation fins connected to the fastening portion and evacuation openings made between two adjacent fins, the air evacuation member being configured to be closed by the at least one first closure member.

13. The nacelle according to claim 11, wherein the female portion is an air inlet member comprising a fastening portion configured to be fastened onto the nacelle, a bottom connected on one side to the fastening portion and a rigid wall connected to a second side of the fastening portion and defining with said bottom an air inlet opening, the air inlet member being configured to be closed by the closure member, wherein the position retention member comprises a stud that projects from the base and is configured to extend towards the female portion and includes a lip that projects from a free end of said stud and is configured to be inserted into the opening of said female portion.

14. The nacelle according to claim 13, further comprising:

a second closure member;

at least one second opening; and a second air inlet member received in said second opening and configured to be temporarily closed by the second closure member.

15. A nacelle for an aircraft engine, the nacelle comprising:

an external surface including:

a first external opening configured to receive a female portion, and a second external opening configured to form an air inlet for a fan of the engine; and at least one closure member according to claim 1, the at least one closure member being configured to temporarily close said female portion received in the first external opening.

\* \* \* \* \*